US008879694B2

(12) United States Patent
Kunii

(10) Patent No.: US 8,879,694 B2
(45) Date of Patent: Nov. 4, 2014

(54) COMMUNICATION APPARATUS AND COMMUNICATION SYSTEM

(75) Inventor: Tadahiro Kunii, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 908 days.

(21) Appl. No.: 12/886,081

(22) Filed: Sep. 20, 2010

(65) Prior Publication Data
US 2011/0129074 A1    Jun. 2, 2011

(30) Foreign Application Priority Data

Nov. 30, 2009   (JP) ................................ 2009-271080

(51) Int. Cl.
| H04M 1/64 | (2006.01) |
| H04M 11/00 | (2006.01) |
| H04N 1/327 | (2006.01) |
| H04L 12/40 | (2006.01) |
| H04N 1/00 | (2006.01) |

(52) U.S. Cl.
CPC .... *H04N 1/00347* (2013.01); *H04N 2201/0093* (2013.01); *H04N 1/32747* (2013.01); *H04N 2201/001* (2013.01); *H04N 2201/0055* (2013.01); *H04L 12/40013* (2013.01); *H04N 2201/0094* (2013.01); *H04N 1/32704* (2013.01); *H04N 1/32708* (2013.01); *H04N 2201/0015* (2013.01)
USPC ................. 379/88.13; 379/93.01; 379/100.06

(58) Field of Classification Search
USPC ...................................................... 379/88.13
See application file for complete search history.

(56) References Cited

U.S. PATENT DOCUMENTS

| 6,278,775 | B1 * | 8/2001 | Sih et al. ................... 379/100.17 |
| 6,956,677 | B1 * | 10/2005 | Cohen ........................... 358/435 |
| 7,573,995 | B2 * | 8/2009 | Gross et al. ............... 379/210.01 |
| 7,596,691 | B2 * | 9/2009 | Koue et al. ..................... 713/154 |
| 7,659,985 | B2 * | 2/2010 | Street, Jr. ....................... 356/436 |
| 7,808,671 | B1 * | 10/2010 | Kirchhoff et al. ............. 358/1.15 |

(Continued)

FOREIGN PATENT DOCUMENTS

| JP | 2-152363 A | 6/1990 |
| JP | 3-169151 A | 7/1991 |

(Continued)

OTHER PUBLICATIONS

Japanese Notification of Reason for Refusal dated Feb. 12, 2013 issued in JP 2009-271080 together with English translation.

*Primary Examiner* — Joseph T Phan
(74) *Attorney, Agent, or Firm* — Scully, Scott, Murphy & Presser, P.C.

(57) ABSTRACT

A communication apparatus including: a communication portion which performs a data communication with a sub-communication apparatus; a transmission-data communicating portion which performs a transmission-data communication with a data processing apparatus; a transmission-data receiving section which receives transmission data from the data processing apparatus; a notifying section which transmits a notification to the sub-communication apparatus, the notification being based on that the transmission-data receiving section has received the transmission data; a relaying section which relays a phone conversation between an external communication apparatus and the sub-communication apparatus; and a transmitting section which transmits the transmission data received by the transmission-data receiving section, to an external communication apparatus as a call opposite party of the phone conversation which is being relayed by the relaying section where a transmission-data transmitting command has been received from the sub-communication apparatus performing the phone conversation being relayed by the relaying section.

12 Claims, 8 Drawing Sheets

(56) References Cited

U.S. PATENT DOCUMENTS

| | | | |
|---|---|---|---|
| 7,831,029 B2* | 11/2010 | Gross et al. | 379/207.02 |
| 7,865,714 B2* | 1/2011 | Koue et al. | 713/150 |
| 7,965,825 B1* | 6/2011 | Herriman et al. | 379/100.08 |
| 8,031,360 B2* | 10/2011 | Kirchhoff et al. | 358/1.15 |
| 8,081,332 B2* | 12/2011 | Nagarajan et al. | 358/1.15 |
| 8,150,479 B2* | 4/2012 | Tenorio Sanz et al. | 455/574 |
| 2002/0157028 A1* | 10/2002 | Koue et al. | 713/202 |
| 2002/0172333 A1* | 11/2002 | Gross et al. | 379/88.22 |
| 2004/0105535 A1* | 6/2004 | Gross et al. | 379/201.01 |
| 2004/0125396 A1* | 7/2004 | Burke | 358/1.13 |
| 2004/0146153 A1* | 7/2004 | Solin | 379/210.02 |
| 2004/0170257 A1* | 9/2004 | Gross et al. | 379/67.1 |
| 2004/0218226 A1* | 11/2004 | Antognini et al. | 358/402 |
| 2005/0153739 A1* | 7/2005 | Halsell | 455/557 |
| 2007/0070399 A1* | 3/2007 | Nakamura et al. | 358/1.15 |
| 2007/0071190 A1* | 3/2007 | Denpo | 379/93.09 |
| 2007/0124575 A1* | 5/2007 | Koue et al. | 713/150 |
| 2007/0124576 A1* | 5/2007 | Koue et al. | 713/150 |
| 2007/0206739 A1* | 9/2007 | Livengood et al. | 379/100.01 |
| 2007/0208931 A1* | 9/2007 | Koue et al. | 713/150 |
| 2008/0007789 A1* | 1/2008 | La | 358/400 |
| 2008/0007791 A1* | 1/2008 | Nagarajan et al. | 358/402 |
| 2008/0074705 A1* | 3/2008 | Shimoyama | 358/400 |
| 2008/0137151 A1* | 6/2008 | Street | 358/407 |
| 2008/0218809 A1* | 9/2008 | Chen et al. | 358/407 |

FOREIGN PATENT DOCUMENTS

| | | |
|---|---|---|
| JP | 6-244998 A | 9/1994 |
| JP | 6-253086 A | 9/1994 |
| JP | 10-256946 A | 9/1998 |
| JP | 10-256948 A | 9/1998 |
| JP | 2002-135477 A | 5/2002 |
| JP | 2002-185666 A | 6/2002 |
| JP | 2006-025216 A | 1/2006 |
| JP | 2007-089041 A | 4/2007 |

* cited by examiner

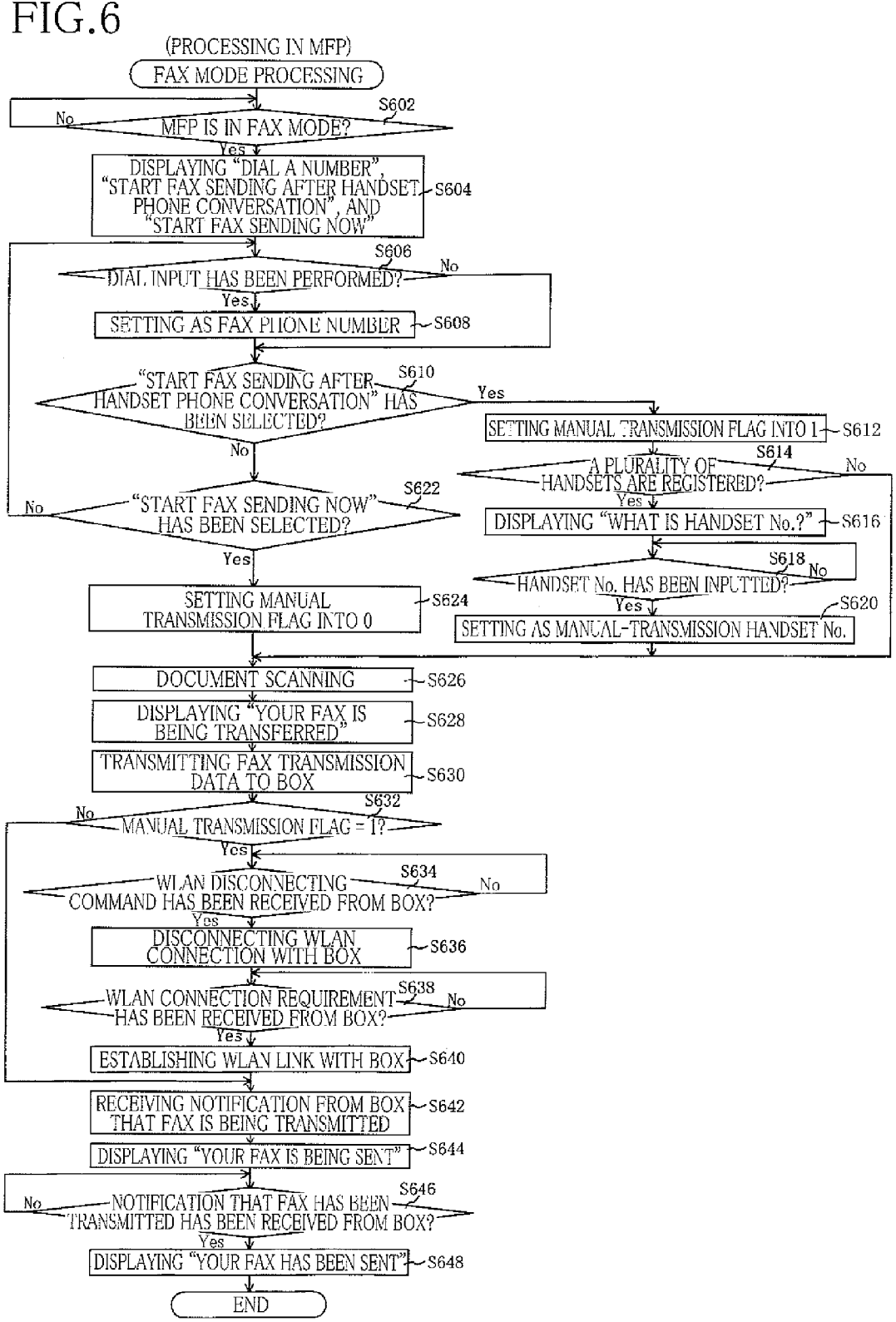

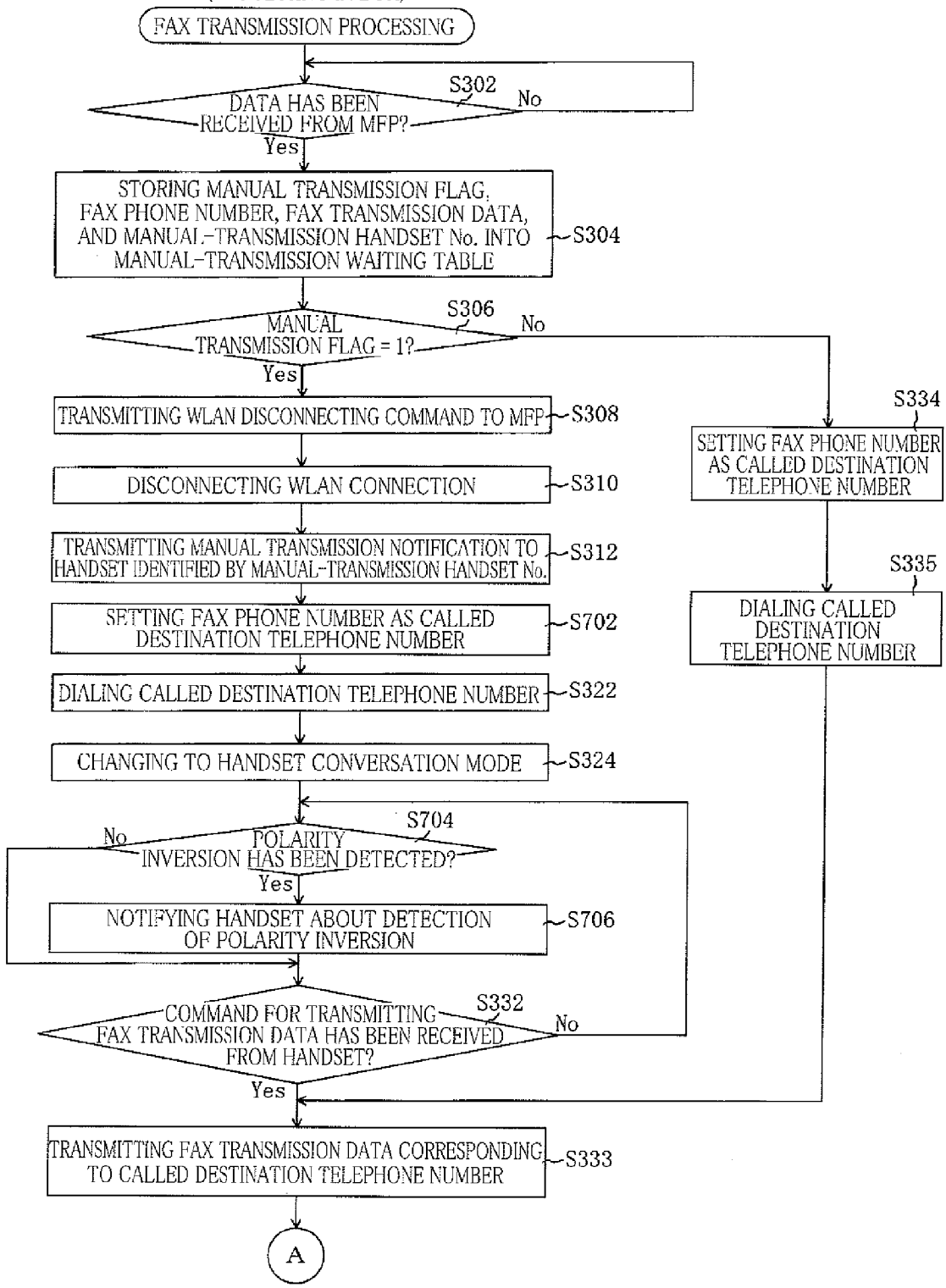

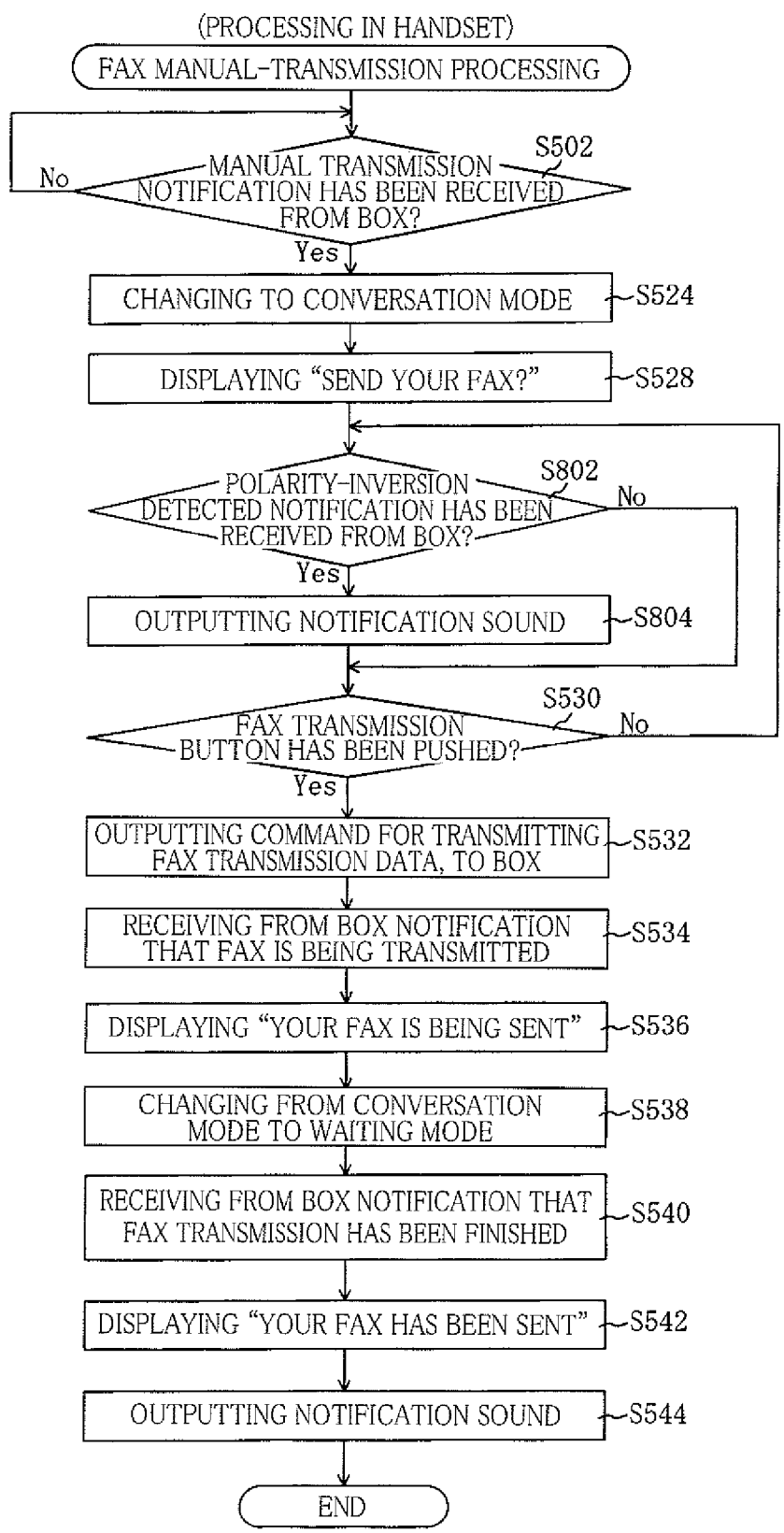

COMMUNICATION APPARATUS AND COMMUNICATION SYSTEM

CROSS REFERENCE TO RELATED APPLICATION

The present application claims priority from Japanese Patent Application No. 2009-271080, which was filed on Nov. 30, 2009, the disclosure of which is herein incorporated by reference in its entirety.

BACKGROUND OF THE INVENTION

1. Field of the Invention

The present invention relates to a communication apparatus and a communication system.

2. Description of the Related Art

There is known a technique for performing a facsimile transmission to a destination dialed by a cordless handset when a facsimile-transmission start button provided on a multi-function peripheral is pushed during a phone conversation using the handset.

SUMMARY OF THE INVENTION

However, in the above-described technique, where a user has pushed the facsimile-transmission start button on the multi-function peripheral when another user using the handset is calling a destination different from a destination of facsimile transmission, there is a possibility of causing an erroneous transmission in which the facsimile is transmitted to the destination different from the destination of the facsimile transmission.

The present invention has been developed in view of the above-described situations, and it is an object of the present invention to provide a communication apparatus and a communication system which can suppress an occurrence of an erroneous transmission.

The object indicated above may be achieved according to the present invention which provides a communication apparatus configured to transmit and receive data to and from an external communication apparatus in a state in which the communication apparatus is connected to a communication network, the communication apparatus comprising: a communication portion configured to perform a data communication with at least one sub-communication apparatus which is configured to perform a phone conversation with the external communication apparatus via the communication network; a transmission-data communicating portion configured to perform a transmission-data communication with a data processing apparatus which is configured to process transmission data to be transmitted to the external communication apparatus; a transmission-data receiving section configured to receive the transmission data transmitted from the data processing apparatus via the transmission-data communicating portion; a notifying section configured to transmit a notification to the at least one sub-communication apparatus via the communication portion, the notification being based on that the transmission-data receiving section has received the transmission data; a relaying section configured to relay the phone conversation between the external communication apparatus and the at least one sub-communication apparatus to which the notification has been transmitted by the notifying section; and a transmitting section configured to transmit the transmission data received by the transmission-data receiving section, to an external communication apparatus as a call opposite party of the phone conversation which is being relayed by the relaying section where a transmission-data transmitting command has been received from the at least one sub-communication apparatus performing the phone conversation being relayed by the relaying section.

It is noted that the present invention can be realized in various forms, in addition to the communication apparatus, such as a communication controlling apparatus configured to control the communication apparatus, a communication method, a communication controlling program for controlling the communication apparatus, and a storage medium for storing the communication controlling program.

According to the construction as described above, the user operates the sub-communication apparatus to output the transmission-data transmitting command after having recognized a destination external communication apparatus by performing the phone conversation using the sub-communication apparatus having received the notification from the communication apparatus, thereby transmitting transmission data to the call opposite party of the phone conversation. Thus, it is possible to suppress an occurrence of an erroneous transmission in which the transmission data is transmitted to a destination not intended.

The object indicated above may be achieved according to the present invention which provides a communication system comprising a data processing apparatus and a communication apparatus comprising: a communication portion configured to perform a data communication with at least one sub-communication apparatus which is configured to perform a phone conversation with an external communication apparatus via a communication network; and a transmission-data communicating portion configured to perform a transmission-data communication with the data processing apparatus configured to process transmission data to be transmitted to the external communication apparatus, wherein the communication apparatus is configured to transmit and receive data to and from the external communication apparatus in a state in which the communication apparatus is connected to the communication network, the communication apparatus further comprising: a transmission-data receiving section configured to receive the transmission data transmitted from the data processing apparatus via the transmission-data communicating portion; a notifying section configured to transmit a notification to the at least one sub-communication apparatus via the communication portion, the notification being based on that the transmission-data receiving section has received the transmission data; a relaying section configured to relay the phone conversation between the external communication apparatus and the at least one sub-communication apparatus to which the notification has been transmitted by the notifying section; and a transmitting section configured to transmit the transmission data received by the transmission-data receiving section, to an external communication apparatus as a call opposite party of the phone conversation which is being relayed by the relaying section where a transmission-data transmitting command has been received from the at least one sub-communication apparatus performing the phone conversation being relayed by the relaying section, and wherein each of the at least one sub-communication apparatus includes: a display portion configured to display thereon specific data transmitted from the notifying section; and a call commanding section configured to command, where a user has selected the specific data displayed on the display portion, the communication apparatus to call the external communication apparatus specified by the selected specific data.

According to the construction as described above, the user operates the sub-communication apparatus to output the transmission-data transmitting command after having recognized the destination external communication apparatus by performing the phone conversation using the sub-communication apparatus having received the notification from the communication apparatus, thereby transmitting the transmission data to the call opposite party of the phone conversation. Thus, it is possible to suppress the occurrence of the erroneous transmission in which the transmission data is transmitted to the destination or the call opposite party not intended. Further, since the sub-communication apparatus controls the display portion to display thereon the specific data transmitted from the communication apparatus, it is possible to have the user of the sub-communication apparatus visually recognize the specific data. Furthermore, since the sub-communication apparatus can have the user select the external communication apparatus to be called, the user does not need to input the specific data into both of the communication apparatus and the sub-communication apparatus, thereby reducing an amount of operations of the user.

BRIEF DESCRIPTION OF THE DRAWINGS

The objects, features, advantages, and technical and industrial significance of the present invention will be better understood by reading the following detailed description of embodiments of the invention, when considered in connection with the accompanying drawings, in which:

FIG. 6 is a flow-chart showing a facsimile mode processing performed by the MFP;

FIG. 7 is a flow-chart partly showing a facsimile transmission processing performed by a BOX in a second embodiment; and FIG. 8 is a flow-chart showing a facsimile manual-transmission processing performed by a handset in the second embodiment.

DESCRIPTION OF THE EMBODIMENTS

Figure 1:
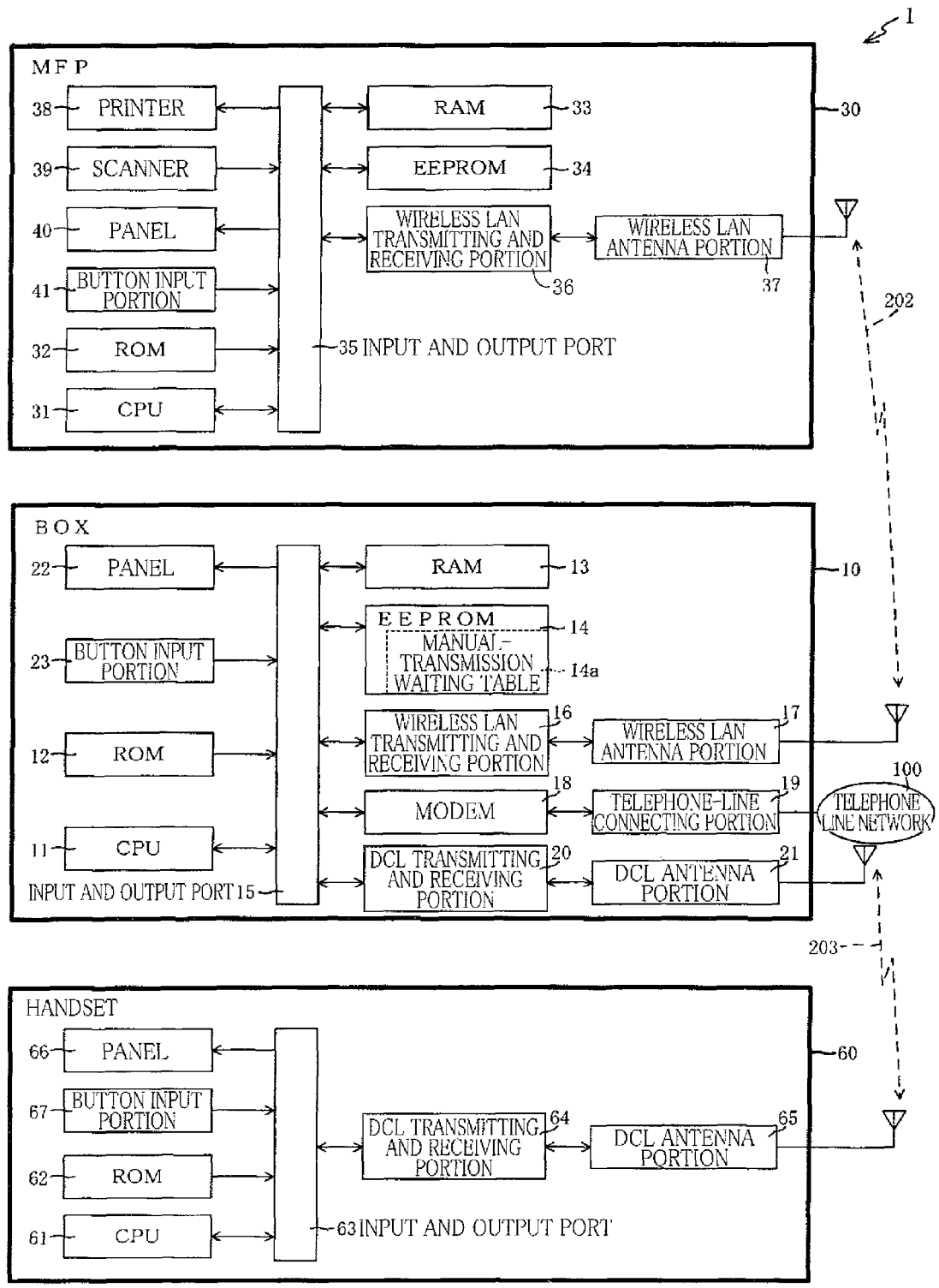
FIG. 1 is a block diagram showing an electric construction of a communication system including a BOX as an example of a communication apparatus to which the present invention is applied, and an MFP and a handset.

Hereinafter, there will be described embodiments of the present invention by reference to the drawings. FIG. 1 shows a communication system 1 including (a) a line controlling apparatus (hereinafter may be referred to as a "BOX") 10 as a first embodiment of a communication apparatus to which the present invention is applied, and (b) a multi-function peripheral (hereinafter may be referred to as an "MFP") 30 as a data processing apparatus and (c) a handset 60 as a sub-communication apparatus. The BOX 10 is a communication apparatus which performs a control of a communication using a telephone line network 100 as a communication network. The MFP 30 has various functions such as a printer function, a scanner function, a copying function, and a facsimile function, and produces data (hereinafter may be referred to as "facsimile transmission data") to be transmitted to an external device (i.e., an external communication apparatus). The handset 60 is a digital cordless phone device for performing a phone conversation with the external device via the telephone line network 100. It is noted that, where the BOX 10 and the handset 60 are considered to have a relationship in which the BOX 10 is a base emit for the handset 60, the BOX 10 and the handset 60 can be considered to constitute a single digital cordless phone as a pair. In this case, the base unit to which the BOX 10 corresponds can be defined as an apparatus connectable to a destination external device by being directly connected to the telephone line network 100, and the handset can be defined as a device which can communicate with the base unit and which can be connected to the destination external device by being connected to the telephone line network 100 only via the base unit. Further, where the BOX 10 and the MFP 30 are constructed integrally with each other, an apparatus including the BOX 10 and the MFP 30 can be defined as the base unit.

In particular, the BOX 10 is an apparatus which is configured to receive the facsimile transmission data from the MFP 30 and transmit the received facsimile transmission data by facsimile so as to suppress occurrence of erroneous transmission. Hereinafter, there will be explained the BOX 10 in detail. It is noted that the BOX 10 as the present embodiment is explained as an apparatus configured to transmit and receive the data by G3FAX using the telephone line network 100, but the BOX 10 may perform the facsimile transmission using another standard such as G4FAX, IPFAX, and Internet FAX.

The BOX 10 includes a CPU 11, a ROM 12, a RAM 13, an EEPROM 14, a wireless LAN transmitting and receiving portion 16 as a part of a transmission-data communicating portion, a wireless LAN antenna portion 17 as a part of the transmission-data communicating portion, a modem 18 as a part of a connecting portion and a communication controlling portion, a telephone-line connecting portion 19 as a part of the connecting portion and the communication controlling portion, a digital cordless telephone (DCL) transmitting and receiving portion 20 as a part of a communication portion, a DCL antenna portion 21 as a part of the communication portion, a panel (a display) 22, and a button input portion 23. These components are connected to one another via an input and output port 15 so as to communicate with one another.

The CPU 11 is configured to control the components connected to the input and output port 15 in accordance with fixed values and programs stored in, e.g., the ROM 12, or various signals transmitted and received via wireless communications 202, 203. The ROM 12 is an unrewritable memory and is configured to store programs for performing processings which will be described below with reference to FIGS. 3 and 4. The RAM 13 is a rewritable volatile memory. The EEPROM 14 is a rewritable nonvolatile memory and includes a manual-transmission waiting table 14a. The manual-transmission waiting table 14a will be explained below with reference to FIG. 2.

The wireless LAN transmitting and receiving portion 16 is a circuit for performing the wireless communication 202 using 2.4 GHz band by using wireless LAN adhering to the IEEE802.11b/g standard. This wireless LAN transmitting and receiving portion 16 makes a connection to the MFP 30 so as to allow data communication. Digital signals respectively constituting various data are transmitted and received via the wireless LAN antenna portion 17. The modem 18 is configured to convert the facsimile transmission data to be transmitted in the facsimile function into a signal transmittable to the telephone line network 100 and is configured to transmit the signal via the telephone-line connecting portion 19. Further, the modem 18 is configured to receive a signal inputted from the telephone line network 100 via the telephone-line connecting portion 19 and decode the signal into image data. The telephone-line connecting portion 19 is configured to connect the telephone line network 100 and the BOX 10 to each other and control a connection state between the BOX 10 and the external device via the telephone line network 100 by connecting or disconnecting the line in accordance with a command outputted from the modem 18.

The DCL transmitting and receiving portion 20 is a circuit for wireless communication between the BOX 10 and the handset 60 via the DCL antenna portion 21 by the wireless communication 203 in a digital system using 2.4 GHz band. The DCL transmitting and receiving portion 20 transmits and receives voice data and various commands between the BOX 10 and the handset 60. The panel 22 displays thereon various functional information of the BOX 10. The button input portion 23 includes a plurality of buttons for performing the functions of the BOX 10.

The MFP 30 includes a CPU 31, a ROM 32, a RAM 33, an EEPROM 34, a wireless LAN transmitting and receiving portion 36, a wireless LAN antenna portion 37, a printer 38, a scanner 39, a panel (a display) 40, and a button input portion 41. These components are connected to one another via an input and output port 35 so as to communicate with one another.

The CPU 31 is configured to control the various functions and the components connected to the input and output port 35 in accordance with fixed values and programs stored in, e.g., the ROM 32, or various signals transmitted and received via the wireless LAN transmitting and receiving portion 36.

The ROM 32 is an unrewritable memory storing control programs performed by the MFP 30 and stores programs for performing processings which will be described below with reference to FIG. 6. The RAM 33 is a rewritable volatile memory. The EEPROM 34 is a rewritable nonvolatile memory. The wireless LAN transmitting and receiving portion 36 is a circuit configured in a similar manner to the above-described wireless LAN transmitting and receiving portion 16 and performs the wireless communication 202 between the MFP 30 and the BOX 10.

The printer 38 is configured to perform printing or recording. The scanner 39 is configured to perform reading of a document. The panel 40 displays thereon various functional information of the MFP 30 and includes a touch panel as a display face of a liquid crystal display portion. A user can input various commands into the MFP 30 by touching the panel 40. The button input portion 41 includes a plurality of buttons for performing the functions of the MFP 30.

The handset 60 includes a CPU 61, a ROM 62, a DCL transmitting and receiving portion 64, a DCL antenna portion 65, a panel (a display) 66 as a display portion, and a button input portion 67 as a command receiving portion. These components are connected to one another via an input and output port 63 so as to communicate with one another.

The CPU 61 is configured to control various functions of the handset 60 and the components connected to the input and output port 63 in accordance with fixed values and programs stored in, e.g., the ROM 62, or various signals transmitted and received via the DCL transmitting and receiving portion 64.

The ROM 62 is an unrewritable memory storing control programs performed by the handset 60 and stores programs for performing processings which will be described below with reference to FIG. 5. The DCL transmitting and receiving portion 64 is configured in a similar manner to the above-described DCL transmitting and receiving portion 20 and performs the wireless communication 203 between the handset 60 and the BOX 10. The panel 66 displays thereon various functional information of the handset 60. The button input portion 67 includes a plurality of buttons for performing the functions of the handset 60. It is noted that the button input portion 67 includes a facsimile transmission button, not shown, for example. The facsimile transmission button provided on the handset 60 may be provided, where the panel 66 is a touch panel, as a button for inputting a signal indicating that the facsimile transmission button has been pushed, into the input and output port 63 by the user touching on a display area of the panel 66. In this case, a part of the panel 66 functions as the facsimile transmission button.

It is noted that a plurality of the MFPs 30 can be connected to the BOX 10 in the communication system 1. Further, the DCL transmitting and receiving portion 20 of the BOX 10 can connect each of a plurality of the handsets 60 and the BOX 10 by the wireless communication 203. Since each of the handsets 60 has a similar construction, only a single handset 60 is shown in FIG. 1. The plurality of the handsets 60 are identified by respective specific handset numbers assigned to the respective handsets 60 in advance.

Where a facsimile is transmitted to the external device in the communication system 1, the user selects one of a "manual transmitting function" and an "automatic transmitting function". The "manual transmitting function" is a function for transmitting the facsimile transmission data after a phone conversation with the external device to which the facsimile transmission data is to be transmitted. The "automatic transmitting function" is a function for transmitting the facsimile transmission data without the phone conversation.

Figure 2:
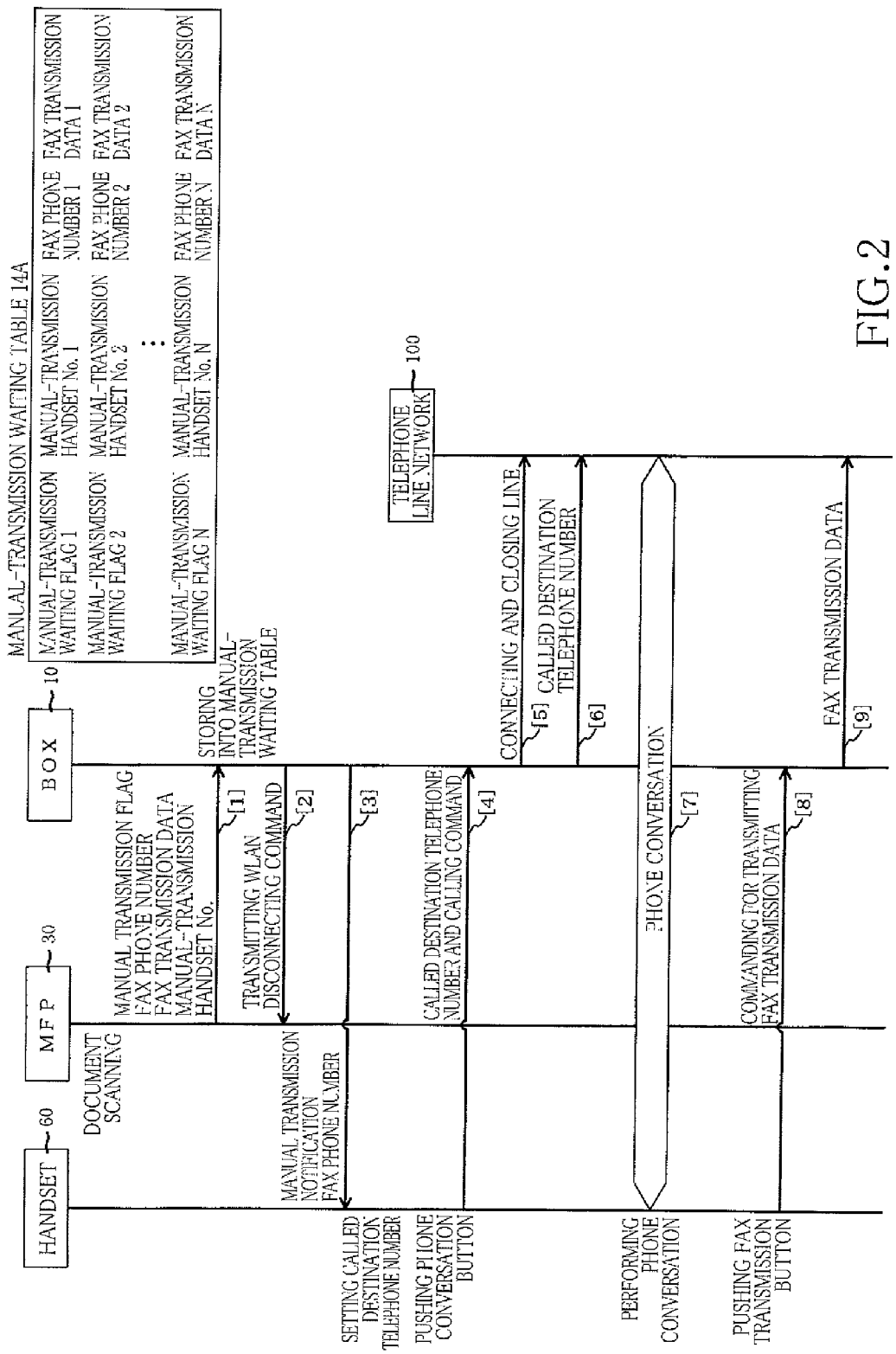
FIG. 2 is a schematic view showing an example of a sequence of a manual transmitting function realized in the communication system.

There will be explained an example of a sequence of the manual transmitting function realized in the communication system 1 with reference to FIG. 2. It is noted that details of processings shown in FIG. 2 will be explained with reference to FIGS. 3 to 6.

Initially, the MFP 30 scans a document by the scanner 39 and produces the facsimile transmission data on the basis of the read document. Then, the MFP 30 brings a manual transmission flag as an identifier, a fax phone number as a specific data, and a manual-transmission handset number as identification data or a identification number into correspondence with the facsimile transmission data and transmits the facsimile transmission data and so on to the BOX 10 (indicated by [1] in FIG. 2).

The manual transmission flag is a flag indicating a type of the transmission. The manual transmission flag is set into "1" where the facsimile is transmitted by the "manual transmitting function" and set into the "automatic transmitting function" into "0". The fax phone number is a number which is inputted into the MFP 30 by the user and which specifies the external device to which the facsimile transmission data is to be transmitted. The user may input the fax phone number by using a telephone book, not shown, stored in the MFP 30. That is, the specific data is data which is brought into correspondence with the facsimile transmission data by being inputted into or selected on the MFD 30 by the user.

The manual-transmission handset number is a handset number which designates the handset 60 used when the "manual transmitting function" is performed. The user operates the MFP 30 to designate the handset number of the handset 60 the user wants to use. The MFP 30 sets the designated handset number as the manual-transmission handset number and notifies the BOX 10 of or about the designated handset number.

The BOX 10 receives the facsimile transmission data and so on transmitted from the MFP 30 via the wireless communication 202 performed by the wireless LAN transmitting and receiving portion 16 and stores the received facsimile transmission data and so on into the manual-transmission waiting table 14*a*. Each time when the BOX 10 has received the facsimile transmission data from the MFP 30, the BOX 10 brings the received facsimile transmission data into correspondence with the manual transmission flag, the manual-transmission handset number, and the fax phone number and stores the facsimile transmission data, the manual transmission flag, the manual-transmission handset number, and the fax phone number into the manual-transmission waiting table 14*a*. It is noted that the facsimile transmission data to be transferred by multicasting transmission may be stored into the manual-transmission waiting table 14*a* so as to be brought into correspondence with a plurality of fax phone numbers.

Then, the BOX 10 transmits a wireless-LAN disconnecting command to the MFP 30 ([2]). Then, the BOX 10 stops the data transmission from the wireless LAN transmitting and receiving portion 16. The MFP 30 stops the data transmission from the wireless LAN transmitting and receiving portion 36 on the basis of the wireless-LAN disconnecting command. That is, after having received the facsimile transmission data, the BOX 10 stops the wireless communication 202 between the BOX 10 and the MFP 30 and continues only the wireless communication 203 between the BOX 10 and the handset 60.

Then, the BOX 10 notifies the handset 60 about (a) a notification indicating that the BOX 10 has been received the facsimile transmission data from the MFP 30 (hereinafter may be referred to as a manual transmission notification) and (b) the fax phone number received from the MFP 30 ([3]). The user can operate the handset 60 to set the fax phone number about which the BOX 10 has notified the handset 60, as a called destination telephone number as call opposite party data. Then, when the user has pushed a phone conversation button included in the button input portion 67, the handset 60 transmits the called destination telephone number and a calling command to the BOX 10 ([4]).

When having received the calling command and the called destination telephone number from the handset 60, the BOX 10 connects and closes the line and transmits a calling signal ([5]), and transmits the called destination telephone number received from the handset 60 ([6]), thereby calling the external device specified by the called destination telephone number.

Then, when a communicable connection state in which communication between the BOX 10 and the external device is possible has been established by a response of a destination external device to the calling, the BOX 10 starts a relay of the phone conversation between the external device and the handset 60 ([7]). In this time, wireless LAN connection between the BOX 10 and the MFP 30 has been disconnected. Thus, even where the wireless communication 202 by the wireless LAN transmitting and receiving portion 16 and the wireless communication 203 by the DCL transmitting and receiving portion 20 use the same frequency band, occurrence of radio interference is suppressed, thereby maintaining a quality of the phone conversation satisfactorily.

Then, when the user performing the phone conversation using the handset 60 has pushed a facsimile transmission button included in the button input portion 67 of the handset 60 during a duration that the connection state of the handset 60 and the external device is the communicable connection state, the handset 60 outputs, to the BOX 10, a command for transmitting the facsimile transmission data (hereinafter may be referred to as a "transmission-data transmitting command") ([8]).

Where the transmission-data transmitting command has been received from the handset 60, the BOX 10 transmits the facsimile transmission data received from the MFP 30, to the external device as a called party of the phone conversation ([9]).

According to the communication system 1, since the BOX 10 notifies the handset 60 about the fax phone number inputted into the MFP 30 by the user, the user can use the fax phone number about which the handset 60 has been notified, to call the external device to which the fax phone number is assigned. Thus, the user does not need to input again, into the handset 60, the fax phone number having been inputted into the MFP 30. Further, the user pushes the facsimile transmission button of the handset 60 after having recognized the destination external device by the phone conversation, thereby transmitting the facsimile transmission data from the BOX 10 to the destination external device as the called party of the phone conversation. Thus, it is possible to suppress the occurrence of the erroneous transmission in which the facsimile transmission data is transmitted to a destination not intended. That is, where the user has called a called party to which the user does not intend to transmit the facsimile transmission data, the user can notice his or her mistake by the phone conversation, and thus the user can disconnect the line without pushing the facsimile transmission button, thereby avoiding transmission of the facsimile transmission data to the called party not intended.

Figure 3:
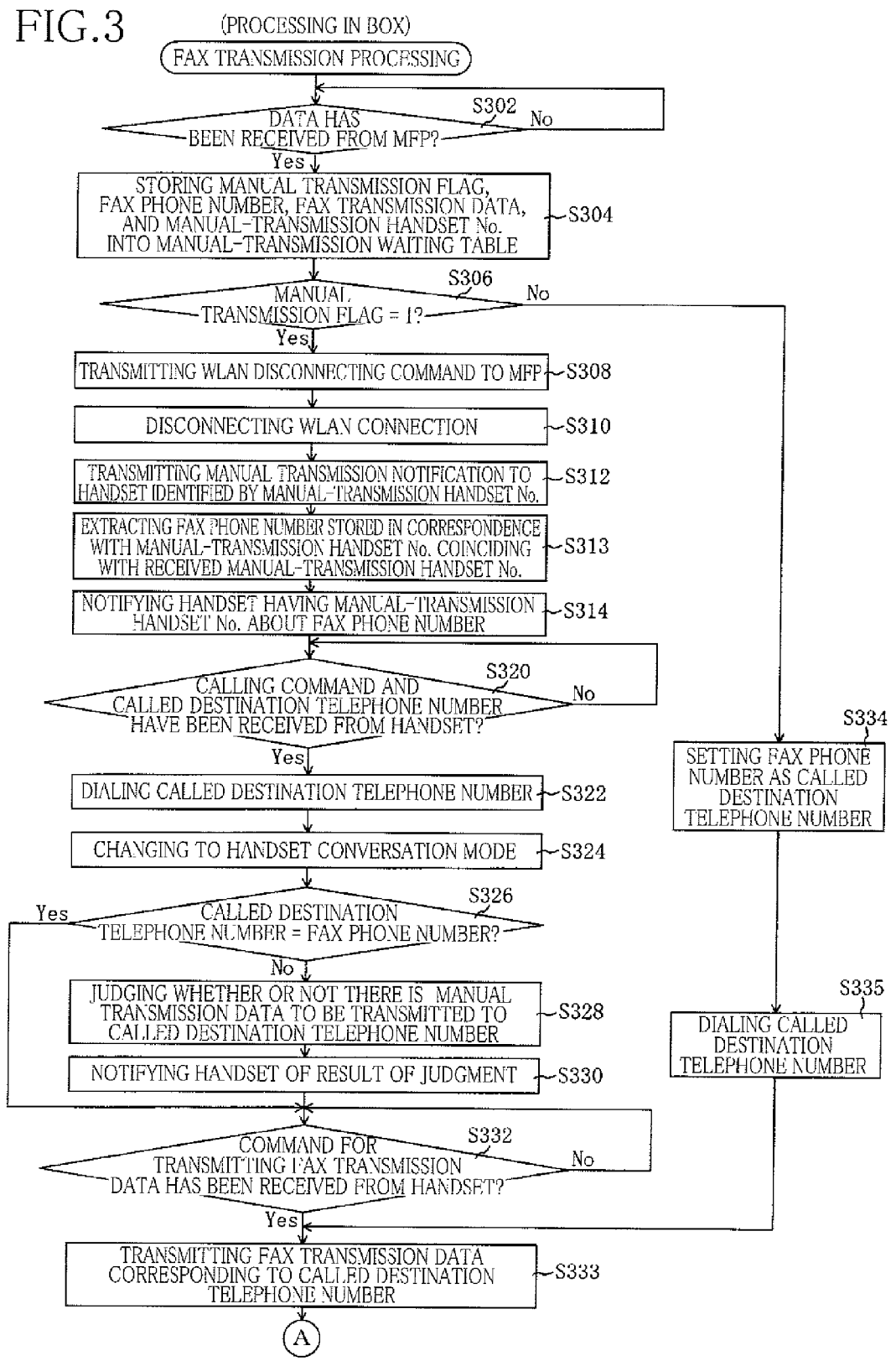
FIG. 3 is a flow-chart showing a part of a facsimile transmission processing performed by the BOX.

There will be next explained a facsimile transmission processing performed by the CPU 11 of the BOX 10 with reference to FIG. 3. This facsimile transmission processing is a processing for performing the facsimile transmission and repeatedly performed from turning on a main power of the BOX 10.

Initially, in S302, the CPU 11 judges whether the BOX 10 has received the data from the MFP 30 or not. Where the CPU 11 has judged that the BOX 10 has not received the data (S302: No), the processing in S302 is reperformed. Where the CPU 11 has judged that the BOX 10 has received the data (S302: Yes), the CPU 11 receives in S304 the manual transmission flag, the fax phone number, the facsimile transmission data, and the manual-transmission handset number transmitted from the MFP 30 and stores these into the manual-transmission waiting table 14*a*.

Then, in S306, the CPU 11 judges whether the manual transmission flag received in S304 is "1" or not. Where the CPU 11 has judged that the manual transmission flag is "1" (S306: Yes), that is, where the "manual transmitting function" has been selected, the CPU 11 transmits in S308 the wireless-LAN disconnecting command to the MFP 30 and disconnects in S310 the wireless LAN connection between the BOX 10 and the MFP 30.

Then, in S312, the CPU 11 transmits the manual transmission notification to the handset 60 identified by the manual-transmission handset number received in S304. As a result, the handset 60 selected by the user can be notified that the BOX 10 has received the facsimile transmission data to be manually transmitted. Then, in S313, the CPU 11 extracts the fax phone number(s) which is stored in the manual-transmission waiting table 14*a* and which has been brought into correspondence with the manual-transmission handset number coinciding with the manual-transmission handset number received in S304. Then, in S314, the CPU 11 notifies the same handset 60 about the extracted fax phone number(s). Thus, even where the communication system 1 includes the plurality of the handsets 60, each handset 60 can be notified about an appropriate fax phone number. Further, where the manual-transmission waiting table 14*a* stores therein, in addition to the fax phone number received in S304, the facsimile transmission data which corresponds to the handset 60 identified by the manual-transmission handset number received in S304 and which cannot be transmitted in the past for some reason, the handset 60 can be also notified about the fax phone number(s) having been brought into correspondence with the facsimile transmission data. As a result, it is possible to remind the user of a presence of the facsimile transmission data which is stored in the manual-transmission waiting table 14a for a relatively long time.

Then, in S320, the CPU 11 judges whether the BOX 10 has received the calling command and the called destination telephone number from the handset 60 or not. Where the CPU 11 has judged that the BOX 10 has not received the calling command and the called destination telephone number (S320: No), the processing in S320 is reperformed. Where the CPU 11 has judged that the BOX 10 has received the calling command and the called destination telephone number (S320: Yes), that is, where the BOX 10 has obtained the called destination telephone number from the handset 60, the CPU 11 dials in S322 the received called destination telephone number. Then, in S324, the CPU 11 changes a mode of the BOX 10 from a handset waiting mode to a handset conversation mode and starts to relay the phone conversation between the handset 60 and the external device. It is noted that the handset conversation mode is a mode in which a voice path and a volume are set, and thereby the transmission and receipt of the voice data between the handset 60 and the telephone line network 100 are made possible while the handset waiting mode is a mode in which the transmission and receipt of the voice data between the handset 60 and the telephone line network 100 are made impossible.

Then, in S326, the CPU 11 judges whether the called destination telephone number obtained from the handset 60 and the fax phone number received from the MFP 30 in S304 coincide with each other or not. Where the CPU 11 has judged that the called destination telephone number and the fax phone number coincide with each other (S326: Yes), the CPU 11 judges in S332 whether the BOX 10 has received the transmission-data transmitting command from the handset 60 or not. Where the CPU 11 has judged that the BOX 10 has not received the transmission-data transmitting command (S332: No), the CPU 11 continues to relay the phone conversation. It is noted that, though not shown in the flow-chart in FIG. 3, where the BOX 10 has received, from the handset 60, a command for disconnecting the line prior to the transmission-data transmitting command, the BOX 10 disconnects the line and changes the mode thereof to the handset waiting mode. That is, the CPU 11 finishes the relay of the phone conversation without transmitting the facsimile transmission data.

On the other hand, where the CPU 11 has judged that the BOX 10 has received the transmission-data transmitting command from the handset 60 (S332: Yes), the CPU 11 starts in S333 to transmit, to the destination external device, the facsimile transmission data received in S304 (i.e., the latest stored facsimile transmission data among the facsimile transmission data stored in the manual-transmission waiting table 14a) while maintaining the connection state between the BOX 10 and the destination external device. Since the BOX 10 transmits the facsimile transmission data on condition that the CPU 11 has judged that the called destination telephone number obtained from the handset 60 and the fax phone number received in S304 coincide with each other, the BOX 10 can transmit the facsimile transmission data to be transmitted to the external device as the called party of the phone conversation. It is noted that, in S326, the CPU 11 may judge whether or not the fax phone number(s) stored in correspondence with the manual-transmission handset number coinciding with the manual-transmission handset number extracted in S313 is the same as the called destination telephone number.

On the other hand, where the CPU 11 has judged that the called destination telephone number and the fax phone number do not coincide with each other (S326: No), the CPU 11 judges in S328 whether the called destination telephone number obtained from the handset 60 is stored in the manual-transmission waiting table 14a or not. Then, in S330, the CPU 11 notifies the handset 60 about a result of the judgment in S328, that is, the CPU 11 transmits, to the handset 60, a notification about whether manual transmission data as the result of the judgment is present or absent. More specifically, the CPU 11 notifies the handset 60 that there is the manual transmission data where the manual-transmission waiting table 14a stores a number coinciding with the called destination telephone number obtained from the handset 60, and the CPU 11 notifies the handset 60 that there is no manual transmission data where the manual-transmission waiting table 14a stores no number coinciding with the called destination telephone number obtained from the handset 60. Thus, the handset 60 can perform an appropriate processing on the basis of whether the called destination telephone number is stored in the manual-transmission waiting table 14a or not. A detail of this processing will be explained below with reference to FIG. 5.

Then, in S332, the CPU 11 judges whether the BOX 10 has received the transmission-data transmitting command from the handset 60 or not. Where the CPU 11 has judged that the BOX 10 has received the transmission-data transmitting command (S332: Yes), the CPU 11 starts in S333 to transmit, to the destination external device, the facsimile transmission data which is stored in the manual-transmission waiting table 14a and which has been brought into correspondence with the fax phone number coinciding with the called destination telephone number obtained from the handset 60.

On the other hand, where the CPU 11 has judged that the manual transmission flag is not "1" (S306: No), that is, where the "automatic transmitting function" has been selected, the CPU 11 sets in S334 the fax phone number received in S304 as the called destination telephone number, then dials in S335 the called destination telephone number, and then starts in S333 to transmit the facsimile transmission data received in S304 to the external device as the called party of the phone conversation.

Figure 4:
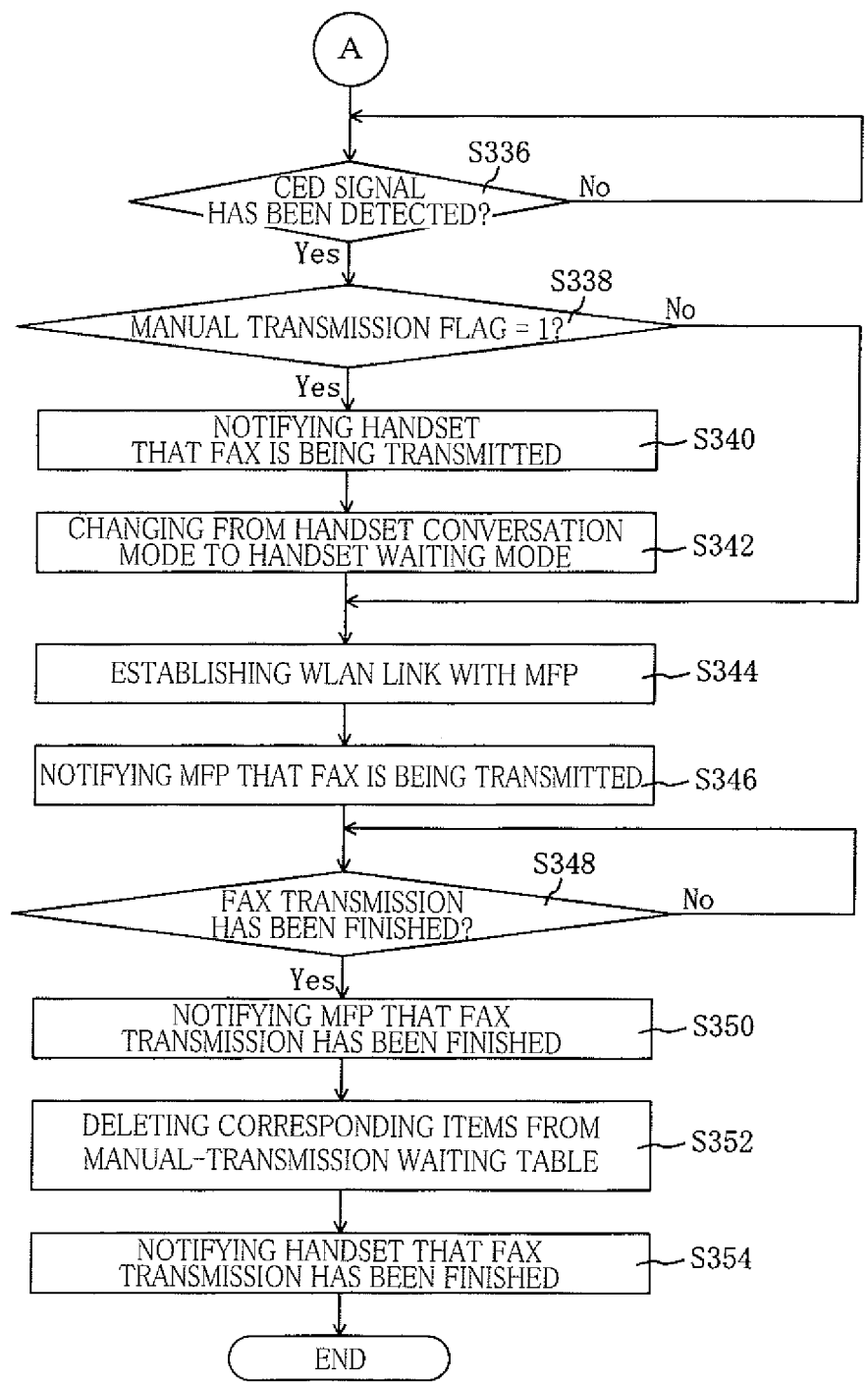
FIG. 4 is a flow-chart showing the other part of the facsimile transmission processing performed by the BOX.

FIG. 4 is a flow-chart showing a part of the facsimile transmission processing which is continued from FIG. 3. As shown in FIG. 4, in S336, the CPU 11 judges whether or not the BOX 10 has detected a CED signal transmitted from the destination external device. Where the CPU 11 has judged that the BOX 10 has not detected the CED signal (S336: No), the processing in S336 is reperformed. Where the CPU 11 has judged that the BOX 10 has detected the CED signal (S336: Yes), the CPU 11 judges in S338 whether the manual transmission flag having been brought into correspondence with the facsimile transmission data to be transmitted to the external device is "1" or not.

Where the CPU 11 has judged that the manual transmission flag is "1" (S338: Yes), that is, where the "manual transmitting function" has been selected, the CPU 11 notifies in S340 the handset 60 that the facsimile is being transmitted and finishes in S342 the relay of the phone conversation by changing the mode of the BOX 10 from the handset conversation mode to the handset waiting mode. On the other hand, where the CPU 11 has judged that the manual transmission flag is not "1" (S338: No), that is, where the "automatic transmitting function" has been selected, this facsimile transmission processing goes to S344 by skipping S340 and S342.

Then, in S344, the CPU 11 transmits a wireless LAN connection requirement to the MFP 30 and establishes a wireless LAN link with the MFP 30. Then, in S346, the CPU 11 notifies the MFP 30 that the facsimile is being transmitted, by the wireless communication 202 between the BOX 10 and the MFP 30. It is noted that the CPU 11 notifies in S340 the handset 60 that the facsimile is being transmitted, before the CPU 11 establishes the wireless LAN link with the MFP 30 in S340, thereby avoiding a failure of transmitting the notification to the handset 60 due to the radio interference.

Then, in S348, the CPU 11 judges whether the transmission of the facsimile transmission data has been finished or not. Where the CPU 11 has judged that the transmission of the facsimile transmission data has not been finished (S348: No), the CPU 11 continues to transmit the facsimile transmission data to the external device. On the other hand, where the CPU 11 has judged that the transmission of the facsimile transmission data has been finished (S348: Yes), the CPU 11 notifies in S350 the MFP 30 that the facsimile transmission has been finished. Then, the CPU 11 deletes in S352 corresponding items, i.e., the facsimile transmission data having been transmitted and the facsimile transmission data, the manual transmission flag, the manual-transmission handset number, and the fax phone number corresponding thereto from the manual-transmission waiting table 14a, then notifies in S354 the handset 60 that the facsimile transmission has been finished, and this facsimile transmission processing is finished.

Figure 5:
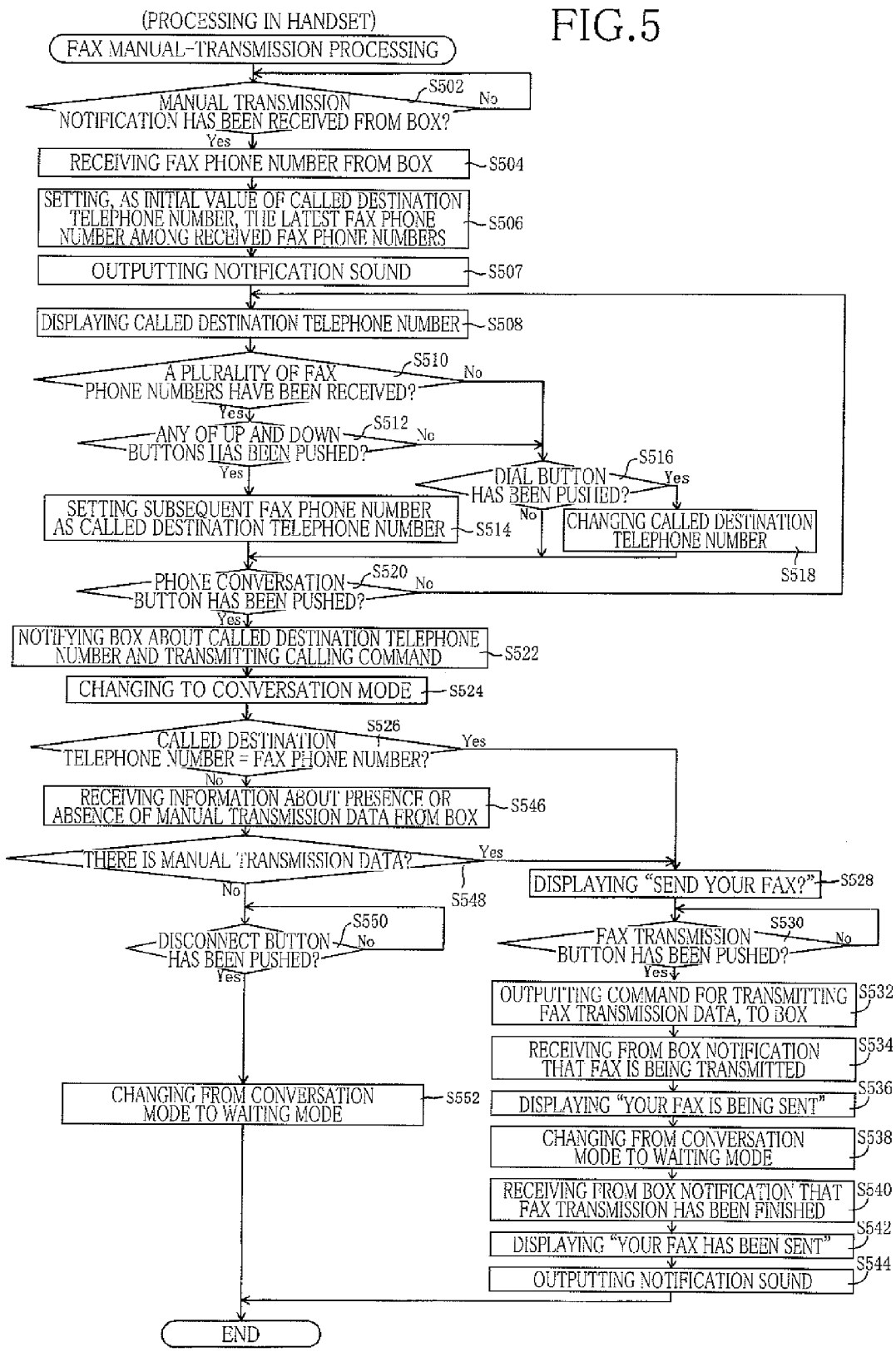
FIG. 5 is a flow-chart showing a facsimile manual-transmission processing performed by the handset.

There will be next explained a facsimile manual-transmission processing performed by the CPU 61 of the handset 60 with reference to FIG. 5. This facsimile manual-transmission processing is performed by the handset 60 when the "manual transmitting function" has been selected in the MFP 30 and repeatedly performed from turning on a main power of the handset 60.

Initially, in S502, the CPU 61 judges whether the handset 60 has received the manual transmission notification or not. Where the CPU 61 has judged that the handset 60 has not received the manual transmission notification (S502: No), the processing in S502 is reperformed. Where the CPU 61 has judged that the handset 60 has received the manual transmission notification (S502: Yes), the CPU 61 receives in S504 the fax phone number from the BOX 10. Where the manual-transmission waiting table 14a of the BOX 10 stores therein a plurality of fax phone numbers each corresponding to the handset number of the handset 60, the handset 60 received the plurality of the fax phone numbers from the BOX 10.

Then, in S506, the CPU 61 sets, as an initial value of the called destination telephone number, the latest or newest fax phone number (i.e., the latest stored fax phone number in the manual-transmission waiting table 14a) among the received fax phone numbers. Then, in S507, the CPU 61 controls a speaker, not shown, to output a notification sound. Then, the CPU 61 displays in S508 the called destination telephone number on the panel 66 and judges in S510 whether the handset 60 has received a plurality of fax phone numbers or not.

Where the handset 60 has received a plurality of fax phone numbers (S510: Yes), the CPU 61 judges in S512 whether any of up and down buttons included in the button input portion 67 has been operated or not. Where the CPU 61 has judged that any of the up and down buttons has been operated (S512: Yes), the CPU 61 displays in S514 a fax phone number subsequent to a fax phone number having been displayed among the received fax phone numbers on the panel 66 and sets in S514 the displayed fax phone number as the called destination telephone number, and this facsimile manual-transmission processing goes to S520.

Where the handset 60 has not received a plurality of fax phone numbers or where the CPU 61 has judged that any of the up and down buttons has not been operated (S510, S512: No), the CPU 61 judges in S516 whether any of dial buttons for inputting numeric values has been pushed or not. Where the CPU 61 has judged that any of the dial buttons has been pushed (S516: Yes), the CPU 61 changes in S518 the called destination telephone number on the basis of the inputted numeric values. Where the CPU 61 has judged that any of the dial buttons has not been pushed (S516: No), this facsimile manual-transmission processing goes to S520 by skipping S518.

Then, in S520, the CPU 61 judges whether the user has pushed the phone conversation button or not. Where the CPU 61 has judged that the user has not pushed the phone conversation button (S520: No), this facsimile manual-transmission processing returns to S508. On the other hand, where the CPU 61 has judged that the user has pushed the phone conversation button (S520: Yes), the CPU 61 notifies in S522 the BOX 10 about the set called destination telephone number and transmits the calling command. As a result, the handset 60 can command the BOX 10 to call the external device specified by the fax phone number selected by the user.

Where the fax phone number received from the BOX 10 is used as the called destination telephone number without any change, it is possible to save the user from having to operate the handset 60 to input again the fax phone number inputted in the MFP 30. Further, since the user can change the fax phone number received from the BOX 10, it is possible to call another external device.

Then, in S524, the CPU 61 changes a mode of the handset 60 to a conversation mode. Then, when the external device has responded to the calling, it becomes possible to perform the phone conversation between the handset 60 and the external device. Then, in S526, the CPU 61 judges whether the called destination telephone number about which the BOX 10 has been notified coincides with the fax phone number received from the BOX 10 or not.

Where the CPU 61 has judged that the called destination telephone number coincides with the fax phone number (S526: Yes), that is, where the fax phone number received from the BOX 10 has been set as the called destination telephone number without any change, the CPU 61 displays in S528 a message "Send your fax?" on the panel 66, for example. Then, in S530, the CPU 61 judges whether the facsimile transmission button has been pushed or not. Where the CPU 61 has judged that the facsimile transmission button has not been pushed (S530: No), the user can continue the phone conversation. It is noted that, though not shown in the flow-chart in FIG. 5, when the user has pushed a disconnect button of the handset 60 during the phone conversation, the CPU 61 outputs the command for disconnecting the line to the BOX 10 and changes the mode of the handset 60 to a waiting mode.

On the other hand, where the CPU 61 has judged that the facsimile transmission button has been pushed (S530: Yes), the CPU 61 outputs in S532 the transmission-data transmitting command to the BOX 10. Then, in S534, the CPU 61 receives from the BOX 10 the notification that the facsimile is being transmitted. Then, in S536, the CPU 61 displays a message "Your fax is being sent" on the panel 66, for example. Thus, the user can recognize that the transmission-data transmitting command has been reliably transmitted to the BOX 10. Further, there is a case where the user commands the MFP 30 to perform the "manual transmitting function" with the handset 60 in his or her hand, and moves away from the MFP 30 while performing the phone conversation using the handset 60. Even in this case, the user can recognize a state of the facsimile transmission by checking the message displayed on the panel 66 of the handset 60. Then, in S538, the CPU 61 changes the mode of the handset 60 from the conversation mode to the waiting mode, thereby forbidding the phone conversation after this processing.

Then, when the CPU 61 has received in S540 the notification that the facsimile transmission has been finished, from the BOX 10, the CPU 61 displays in S542 a message "Your fax has been sent" on the panel 66, for example. Then, in S544, the CPU 61 controls the speaker, not shown, to output the notification sound and changes the handset 60 to a standby state, and this facsimile manual-transmission processing is finished. The user can recognize the completion of the facsimile transmission by the message and the output of the notification sound.

On the other hand, where the CPU 61 has judged that the called destination telephone number does not coincide with the fax phone number (S526: No), that is, where the user has changed the fax phone number received from the BOX 10 and set the changed fax phone number as the called destination telephone number, the CPU 61 receives in S546 information about a presence or an absence of the manual transmission data transmitted from the BOX 10.

Then, in S548, the CPU 61 judges whether or not the handset 60 has been notified from the BOX 10 that the manual-transmission waiting table 14*a* stores therein the manual transmission data to be transmitted to an external device as a called party of a current phone conversation. Where the CPU 61 has judged that the handset 60 has received this notification from the BOX 10 (S548: Yes), the CPU 61 performs the processings in S528 to S544. That is, the CPU 61 judges whether the user has pushed the facsimile transmission button or not, and where the CPU 61 has judged that the user has pushed the facsimile transmission button, the CPU 61 commands the BOX 10 to transmit the facsimile transmission data.

On the other hand, where the CPU 61 has judged that the handset 60 has been notified from the BOX 10 that the manual-transmission waiting table 14*a* stores therein no facsimile transmission data to be transmitted to the external device as the called party of the current phone conversation (S548: No), the CPU 61 judges in S550 whether the disconnect button included in the button input portion 67 has been pushed or not. Where the CPU 61 has judged that the disconnect button has not been pushed (S550: No), the processing in S550 is reperformed. On the other hand, where the CPU 61 has judged that the disconnect button has been pushed (S550: Yes), the CPU 61 changes in S552 the mode of the handset 60 from the conversation mode to the waiting mode and changes the handset 60 to the standby state, and this facsimile manual-transmission processing is finished.

As thus described, where the facsimile transmission data to be transmitted is not stored in the manual-transmission waiting table 14*a*, the CPU 11 of the handset 60 does not accept the input of the transmission-data transmitting command by the user. Thus, it is possible to avoid the occurrence of the erroneous transmission in which the facsimile transmission data is transmitted to a destination not intended.

There will be next explained a facsimile mode processing performed by the CPU 31 of the MFP 30 with reference to FIG. 6. This facsimile mode processing is a processing for performing the facsimile transmission from the MFP 30 to the external device and repeatedly performed from turning on a main power of the MFP 30.

Initially, in S602, the CPU 31 judges whether the MFP 30 is in a facsimile mode or not. Where the CPU 31 has judged that the MFP 30 is not in the facsimile mode (S602: No), the processing in S602 is reperformed. Where the CPU 31 has judged that the MFP 30 is in the facsimile mode (S602: Yes), the CPU 31 displays in S604 messages "Dial a number", "Start fax sending after handset phone conversation", and "Start fax sending now" on the panel 40, for example.

Then, in S606, the CPU 31 judges whether a dial input has been performed or not, that is, the CPU 31 judges whether numbers constituting respective digits of the fax phone number has been inputted or not. Where the CPU 31 has judged that the dial input has been performed (S606: Yes), the CPU 31 sets in S608 the inputted numbers as the fax phone number. On the other hand, where the CPU 31 has judged that the dial input has not been performed (S606: No), this facsimile mode processing goes to S610 by skipping S608.

Then, in S610, the CPU 31 judges whether or not the user has selected the "manual transmitting function" by touching the message "Start fax sending after handset phone conversation" displayed on the panel 40 with his or her finger, for example. Where the CPU 31 has judged that the user has selected the "manual transmitting function" (S610: Yes), the CPU 31 sets in S612 the manual transmission flag into "1" and then judges in S614 whether a plurality of the handsets 60 are registered or not.

Where the CPU 31 has judged that a plurality of the handsets 60 are registered (S614: Yes), the CPU 31 displays in S616 a message "What is handset number?" on the panel 40, for example. Then, in S618, the CPU 31 judges whether the handset number has been inputted by the user or not. Where the CPU 31 has judged that the handset number has not been inputted (S618: No), the processing in S618 is reperformed. On the other hand, where the CPU 31 has judged that the handset number has been inputted (S618: Yes), the CPU 31 sets in S620 the inputted handset number as the manual-transmission handset number, and this facsimile mode processing goes to S626. It is noted that, where the CPU 31 has judged that a plurality of the handsets 60 are not registered (S614: No), this facsimile mode processing goes to S626 by skipping S616 to S620.

On the other hand, where the CPU 31 has judged that the user has not selected the "manual transmitting function" (S610: No), the CPU 31 judges in S622 whether or not the user has selected the "automatic transmitting function" by touching the message "Start fax sending now" displayed on the panel 40 with his or her finger, for example. Where the CPU 31 has judged that the user has not selected the "automatic transmitting function" (S622: No), this facsimile mode processing returns to S606. On the other hand, where the CPU 31 has judged that the user has selected the "automatic transmitting function" (S622: Yes), the CPU 31 sets in S624 the manual transmission flag into "0", this facsimile mode processing goes to S626.

Then, in S626, the CPU 31 controls the scanner 39 to scan a document placed on a document board, not shown, of the scanner 39 and produces the facsimile transmission data on the basis of this scanning. Then, in S628, the CPU 31 displays the message "Your fax is being sent" on the panel 40, for example. Then, in S630, the CPU 31 brings the manual transmission flag, the fax phone number, and the manual-transmission handset number into correspondence with the produced facsimile transmission data and transmits these to the BOX 10 by the wireless communication 202. Then, in S632, the CPU 31 judges whether the manual transmission flag transmitted in S630 is "1" or not.

Where the CPU 31 has judged that the manual transmission flag is "1" (S632: Yes), the CPU 31 judges in S634 whether the MFP 30 has received the wireless-LAN disconnecting command from the BOX 10 or not. Where the CPU 31 has judged that the MFP 30 has not received the wireless-LAN disconnecting command (S634: No), the processing in S634 is reperformed. On the other hand, where the CPU 31 has judged that the MFP 30 has received the wireless-LAN disconnecting command (S634: Yes), the CPU 31 stops in S636 the transmission of the data from the wireless LAN transmitting and receiving portion 36 and disconnects the wireless LAN connection between the MFP 30 and the BOX 10.

Then, in S638, the CPU 31 judges whether the MFP 30 has received the wireless LAN connection requirement from the BOX 10 or not. Where the CPU 31 has judged that the MFP 30 has not received the wireless LAN connection requirement (S638: No), the processing in S638 is reperformed. Where the CPU 31 has judged that the MFP 30 has received the wireless LAN connection requirement (S638: Yes), the CPU 31 restarts in S640 to transmit the data from the wireless LAN transmitting and receiving portion 36 and establishes the wireless LAN link with the BOX 10. It is noted that, where the CPU 31 has judged that the manual transmission flag is not "1" (S632: No), this facsimile mode processing goes to S642 by skipping S634 to S640.

Then, when the MFP 30 has been notified in S642 from the BOX 10 that the facsimile is being transmitted, the CPU 31 displays in S644 the message "Your fax is being sent" on the panel 40, for example. Thus, even where the user is near the MFP 30, the MFP 30 can inform the user about the state of the BOX 10. Then, in S646, the CPU 31 judges whether or not the MFP 30 has been notified from the BOX 10 that the facsimile has been transmitted. Where the CPU 31 has judged that the MFP 30 has not been notified that the facsimile has been transmitted (S646: No), the processing in S646 is reperformed. On the other hand, where the CPU 31 has judged that the MFP 30 has been notified that the facsimile has been transmitted (S646: Yes), the CPU 31 displays in S648 a message "Your fax has been sent" on the panel 40, for example, this facsimile mode processing is finished.

In the above-described communication system 1 in the first embodiment, the BOX 10 notifies the handset 60 about the fax phone number inputted into the MFP 30. However, this communication system 1 may be configured such that the BOX 10 does not notify the handset 60 about the fax phone number, as a second embodiment explained below. It is noted that the same reference numerals as used in the first embodiment are used to designate the corresponding elements of the communication system 1 as the second embodiment, and an explanation of which is dispensed with. Further, a facsimile mode processing performed by the MFP 30 in the second embodiment is the same processing as the facsimile mode processing in the first embodiment explained with reference to FIG. 6, and an explanation and a drawing of which are dispensed with.

There will be next explained a facsimile transmission processing performed by the CPU 11 of the BOX 10 as the second embodiment with reference to FIG. 7. It is noted that steps identical with those in the facsimile transmission processing in the first embodiment explained with reference to FIG. 3 are denoted by the same step numbers, and an explanation of which is dispensed with.

As shown in FIG. 7, where the BOX 10 receives the facsimile transmission data from the MFP 30, the CPU 11 transmits in S312 the manual transmission notification to the handset 60 as in the first embodiment, but the CPU 11 does not notify the handset 60 about the fax phone number received from the MFP 30. Instead, the CPU 11 sets in S702 the fax phone number received from the MFP 30 as the called destination telephone number and dials in S322 the called destination telephone number.

Then, the CPU 11 changes in S324 the mode of the BOX 10 to the handset conversation mode and judges in S704 whether or not the BOX 10 has detected a polarity inversion indicating that the destination external device has responded. Where the CPU 11 has judged that the BOX 10 has not detected the polarity inversion (S704: No), this facsimile mode processing goes to S332 by skipping S706. Where the CPU 11 has judged that the BOX 10 has detected the polarity inversion (S704: Yes), the CPU 11 notifies in S706 the handset 60 about the detection of the polarity inversion. Then, the CPU 11 relays phone conversation between the handset 60 and the external device specified by the fax phone number received from the MFP 30.

It is noted that processings after S333 in the facsimile transmission processing in the second embodiment are respectively identical to corresponding processings in the facsimile transmission processing in FIG. 4, and an explanation and a drawing of which are dispensed with.

There will be next explained a facsimile manual-transmission processing performed by the CPU 61 of the handset 60 in the second embodiment with reference to FIG. 8. It is noted that steps identical with those in the facsimile manual-transmission processing in the first embodiment explained with reference to FIG. 5 are denoted by the same step numbers, and an explanation of which is dispensed with.

In the second embodiment, after changing in S524 the mode of the handset 60 to the conversation mode, the CPU 61 judges in S802 whether the handset 60 has received a polarity-inversion detected notification from the BOX 10 or not. Where the CPU 61 has judged that the handset 60 has received the polarity-inversion detected notification (S802: Yes), the CPU 61 outputs in S804 the notification sound from the speaker, not shown, and then judges in S530 whether the facsimile transmission button has been pushed or not. On the other hand, where the CPU 61 has judged that the handset 60 has not received the polarity-inversion detected notification (S802: No), this facsimile manual-transmission processing goes to S530 by skipping S804.

In the BOX 10 as the second embodiment, the BOX 10 calls the external device specified by the fax phone number received by the MFP 30 on condition that the fax phone number has been received by the MFP 30 and, transmits the facsimile transmission data after the BOX 10 has relayed the phone conversation between the called external device and the handset 60. Thus, it is possible to suppress the occurrence of the erroneous transmission in which the facsimile transmission data is transmitted to a destination not intended.

In view of the above, the CPU 11 can be considered to include a transmission-data receiving section configured to receive the facsimile transmission data transmitted from the MFP 30, and this transmission-data receiving section can be considered to perform the processing in S304. Further, the CPU 11 can be considered to include a notifying section configured to notify the handset 60 that the transmission-data receiving section has received the facsimile transmission data, and this notifying section can be considered to perform the processing in S312. Further, the CPU 11 can be considered to include a relaying section configured to relay the phone conversation between the external device and the handset 60, and this relaying section can be considered to perform the processing in S324. Further, the CPU 11 can be considered to include a transmitting section configured to transmit the facsimile transmission data to the destination external device as a call opposite party of the phone conversation which is being relayed by the relaying section where a transmission-data transmitting command has been received from the handset 60, and this transmitting section can be considered to perform the processing in S333.

Further, the CPU 11 can be considered to include a specific-data receiving section configured to receive the fax phone number from the MFP 30, and this specific-data receiving section can be considered to perform the processing in S304. Further, the CPU 11 can be considered to include a call-opposite-party-data obtaining section configured to obtain the call opposite party data as the called destination telephone number, and this call-opposite-party-data obtaining section can be considered to perform the processing in S322. Further, the CPU 11 can be considered to include a first judging section configured to judge whether the called destination telephone number and the fax phone number coincide with each other or not, and this first judging section can be considered to perform the processing in S326.

Further, the CPU 11 can be considered to include an identification-data receiving section configured to receive the manual-transmission handset number from the MFP 30, and this identification-data receiving section can be considered to perform the processing in S304. Further, the CPU 11 can be considered to include a storage section configured to store the facsimile transmission data received from the MFP 30 such that the received transmission data is brought into correspondence with the received fax phone number and the received manual-transmission handset number, and this storage section can be considered to perform the processing in S304. Further, the CPU 11 can be considered to include an extracting section configured to extract, on condition that the identification-data receiving section receives the manual-transmission handset number from the MFP 30, the fax phone number which is stored in the storage section and which has been brought into correspondence with the received the manual-transmission handset number, and this extracting section can be considered to perform the processing in S313. Further, the CPU 11 can be considered to include a second judging section configured to judge whether the fax phone number coinciding with obtained the called destination telephone number is stored in the storage section or not, and this second judging section can be considered to perform the processing in S326. Further, the CPU 11 can be considered to include a data presence-or-absence notifying section configured to notify the handset 60 identified by the received manual-transmission handset number, of a result of the judgment of the second judging section, and this data presence-or-absence notifying section can be considered to perform the processing in S330.

Further, the CPU 11 can be considered to include a calling section configured to call, on condition that the specific-data receiving section receives the fax phone number, the specified external device, and this calling section can be considered to perform the processing in S322. Further, the CPU 11 can be considered to include an identifier receiving section configured to receive the manual transmission flag indicating whether or not the facsimile transmission data received by the transmission-data receiving section is to be transmitted on condition that the transmission-data transmitting command transmitted from the handset 60 has been received, and this identifier receiving section can be considered to perform the processing in S304. Further, the CPU 61 can be considered to include a call commanding section configured to command, where the user has selected the fax phone number displayed on the panel 66, the communication apparatus to call the external device specified by the selected fax phone number, and this call commanding section can be considered to perform the processing in S522.

While the embodiments of the present invention have been described above, it is to be understood that the invention is not limited to the details of the illustrated embodiments, but may be embodied with various changes and modifications, which may occur to those skilled in the art, without departing from the spirit and scope of the invention.

For example, in the above-described embodiment, the BOX 10 and the MFP 30 are wirelessly connected to each other. However, even where the BOX 10 and the MFP 30 are connected to each other by wired means, the present invention is applicable to the BOX 10.

Further, in the above-described embodiment, the MFP 30 includes the scanner 39 and controls the scanner 39 to read the document to produce the facsimile transmission data, and then transmits the produced facsimile transmission data to the BOX 10, but the MFP 30 may not include the scanner 39. For example, the MFP 30 may be configured to read data from a memory card mounted in the MFP 30, then produce the facsimile transmission data on the basis of the read data, and transmit the produced facsimile transmission data to the BOX 10.

Further, in the above-described embodiment, the fax phone number is used, but other information such as a name of a called party may be used instead of the fax phone number, for example.

Further, in the above-described embodiment, the MFP 30 and the BOX 10 are constructed independently of each other but may be constructed integrally with each other. Where the MFP 30 and the BOX 10 are constructed integrally with each other, the scanner 39 functions as the data processing apparatus, and an apparatus including the MFP 30 and the BOX 10 functions as the communication apparatus to which the present invention is applied.

Further, in the above-described embodiment, the telephone line network 100 is used as the communication network, but an ISDN line, a CATV line, and an interne may be used as the communication network, for example. Further, what is called an IP telephone system in which the voice data is transmitted and received in the form of packets may be used as the communication system 1.

Further, in the first embodiment, the BOX 10 transmits the facsimile transmission data where a condition that the called destination telephone number obtained from the handset 60 and the fax phone number stored in the manual-transmission waiting table 14a coincide with each other is satisfied. The present invention is not limited to this configuration. For example, the BOX 10 may be configured so as to transmit the facsimile transmission data where this condition and a condition that the handset number of the handset 60 whose phone conversation is relayed and the manual-transmission handset number stored in the manual-transmission waiting table 14a coincide with each other are satisfied.

Further, in the communication system 1, the BOX 10 may be configured such that, where the MFP 30 has transmitted the wireless LAN connection requirement to the BOX 10 during the phone conversation using the handset 60, the BOX 10 stops relaying the phone conversation between the handset 60 and the external device by changing the mode of the BOX 10 to the handset waiting mode while maintaining the line with the called party of the phone conversation. Where the BOX 10 is configured in this manner, the BOX 10 may be configured such that the CPU 11 judges whether the transmission of the wireless LAN connection requirement from the MFP 30 is for the transmission of the facsimile transmission data or not, and where the transmission of the wireless LAN connection requirement is for the transmission of the facsimile transmission data, the BOX 10 receives the facsimile transmission data from the MFP 30 and notifies the handset 60 that the facsimile transmission data has been received. Where the BOX 10 is configured in this manner, the BOX 10 can notify the user in the phone conversation using the handset 60 about a presence of the facsimile transmission data to be transmitted by, e.g., a message or a notification sound.

Further, the BOX 10 may be configured such that, where the user has operated the handset 60 to transmit the facsimile transmission data, the BOX 10 transmits the facsimile transmission data. In this configuration, the facsimile transmission data is transmitted where the user having performed the phone conversation with the external device operates the handset 60 to transmit the facsimile transmission data. Thus, it is possible to prevent the occurrence of the erroneous transmission. Further, according to this modification, the BOX 10 can interrupt the phone conversation with the transmission of the facsimile transmission data even where the phone conversation is being performed.

Further, in this modification, the BOX 10 may be configured such that, where the transmission of the wireless LAN connection requirement from the MFP 30 during the phone conversation using the handset 60 is not for the transmission of the facsimile transmission data, the BOX 10 restarts to relay the phone conversation and disconnects the wireless LAN link between the BOX 10 and the MFP 30.

Further, in the first embodiment, the BOX 10 notifies the handset 60 about the fax phone number, but instead of or in addition to this, the BOX 10 may notify the handset 60 about a job number assigned to the facsimile transmission data or a reduced-size image of the facsimile transmission data and display the job number or the reduced-size image on the panel 66 of the handset 60, for example. Furthermore, the BOX 10 may select the facsimile transmission data to be transmitted from the BOX 10 on the basis of the job number or the reduced-size image selected by the user on the handset 60. Where the BOX 10 is configured in this manner, the user can freely select the facsimile transmission data to be transmitted, by the operation of the handset 60.

Further, in the first embodiment, the handset 60 having received the manual transmission notification from the BOX 10 displays on the panel 66 the fax phone number transmitted from the BOX 10, but instead of or in addition to this, the handset 60 may display on the panel 66 the reception of the manual transmission notification from the BOX 10 or inform the user about the reception by the output of the notification sound. Where the handset 60 is configured in this manner, even where the user has operated the MFP 30 to scan the document in order to transmit the facsimile by the "manual transmitting function" but has forgotten that the facsimile transmitting operation is in progress because the user is busy with other operations or works, for example, the notification from the handset 60 can remind the user that the facsimile transmitting operation is in progress. Further, even where the user has operated the MFP 30 to scan the document in order to transmit the facsimile by the "manual transmitting function" but another user who does not know this operation is going to make a phone call by using the handset 60 though the document has been read by the MFP 30, the notification of the handset 60 can causes said another user to notice that someone other than himself or herself is going to transmit the facsimile, whereby the user can stop making the phone call, for example.

It is noted that, in the above-described embodiments, the BOX 10 transmits in S312 the manual transmission notification to the handset 60 identified by the manual-transmission handset number received in S304 and notifies the same handset 60 about the fax phone number extracted in S313, but the present invention is not limited to this configuration. For example, the BOX 10 may be configured such that where there is any handset 60 other than the handset 60 identified by the manual-transmission handset number received in S304, the BOX 10 transmits the manual transmission notification to the handset 60 other than the handset 60 identified by the manual-transmission handset number received in S304 and notifies the handset 60 other than the identified handset 60 about the fax phone number extracted in S313. Where the BOX 10 is configured in this manner, even where the user has inputted by mistake into the MFP 30 the handset number different from the handset number of the handset 60 the user wants to use, the manual transmission notification is also transmitted to the handset 60 the user wants to use. Thus, the user can speedily transmit the facsimile.

Further, in the above-described embodiments, the user inputs into the MFP 30 the handset number corresponding to the handset 60 by which the transmission-data transmitting command is to be transmitted, and the BOX 10 transmits the notification to the handset 60 corresponding to the manual-transmission handset number received from the MFP 30, but the present invention is not limited to this configuration. For example, where the number of handsets 60 which communicate with the BOX 10 is one, the input of the handset number into the MFP 30 may be omitted. According to this configuration, the BOX 10 does not need to identify the handset 60, thereby reducing a load on the processings of the CPU 11.

What is claimed is:

1. A communication apparatus comprising:
a first communicating portion configured to allow the communication apparatus to communicate with an external communication apparatus via a telephone line;
a second communicating portion configured to allow the communication apparatus to communicate with at least one sub-communication apparatus;
a third communicating portion configured to allow the communication apparatus to communicate with a data processing apparatus which is configured to process data;
a data receiving section configured to receive the data transmitted from the data processing apparatus via the third communicating portion;
a notifying section configured to transmit a notification to the at least one sub-communication apparatus via the second communicating portion in response to receipt of the data transmitted from the data processing apparatus;
a transmitting request receiving section configured to receive a transmitting request from the at least one sub-communication apparatus to which the notification had been transmitted;
a connection control section configured to establish a communication between the communication apparatus and the external communication apparatus in response to a connecting command transmitted from the at least one sub-communication apparatus;
a transmitting section configured to transmit the data received by the data receiving section to the external communication apparatus in response to receipt of the transmitting request from the at least one sub-communication apparatus to which the notification had been transmitted;

a first receiving section configured to receive an identification number from the data processing apparatus via the third communicating portion, the identification number being for identifying the external communication apparatus to which the data is to be transmitted;
a dialing-number obtaining section configured to obtain a dialing number transmitted from the at least one sub-communication apparatus, wherein a dialed-external communication apparatus is the external communication apparatus with which the at least one sub-communication apparatus is under communication via the telephone line; and
a first judging section configured to judge whether the dialing number obtained by the dialing-number obtaining section and the identification number received by the first receiving section coincide with each other or not,
wherein the notifying section is configured to transmit the notification, to the at least one sub-communication apparatus, of the identification number received by the first receiving section, and
wherein the transmitting section is configured to transmit the data received by the data receiving section to the external communication apparatus as the dialed-external communication apparatus when the first judging section has judged that the dialing number and the identification number coincide with each other.

2. The communication apparatus according to claim 1,
wherein, when the at least one sub-communication apparatus is a plurality of sub-communication apparatuses, the second communicating portion is configured to communicate with each of the plurality of sub-communication apparatuses,
wherein the communication apparatus further comprises a sub-communication-apparatus-information receiving section configured to receive a sub-communication-apparatus information from the data processing apparatus, the sub-communication-apparatus information being for identifying each of the plurality of sub-communication apparatuses, and
wherein the notifying section is configured to notify only at least one of the plurality of sub-communication apparatuses which is identified by the sub-communication-apparatus information.

3. The communication apparatus according to claim 2, further comprising:
a storage section configured to store the data received by the data receiving section from the data processing apparatus such that the received data is associated with the identification number received by the first receiving section, wherein the storage section is configured to store the sub-communication apparatus information received by the sub-communication apparatus-information receiving section such that the sub-communication-apparatus information is associated with the identification number; and
an extracting section configured to extract, on condition that the sub-communication-apparatus-information receiving section receives the sub-communication-apparatus information from the data processing apparatus, the identification number which is stored in the storage section and which has been associated with the received the sub-communication-apparatus information,
wherein the notifying section is configured to transmit the notification to the at least one of the plurality of sub-communication apparatuses, which is identified by the sub-communication-apparatus information received by the sub-communication-apparatus-information receiving section, the notification comprising the identification number extracted by the extracting section.

4. The communication apparatus according to claim 3, further comprising:
a second judging section configured to judge whether the identification number coinciding with dialing number obtained by the dialing number obtaining section is stored in the storage section or not; and
a data presence-or-absence notifying section configured to transmit the notification to the at least one of the plurality of sub-communication apparatuses which is identified by the sub-communication-apparatus information received by the sub-communication-apparatus-information receiving section, the notification comprising a result of the judgment of the second judging section.

5. The communication apparatus according to claim 1,
wherein the connection control section is configured to establish the communication between the communication apparatus and the external communication apparatus identified by the received identification number, on condition that the first receiving section receives the identification number.

6. The communication apparatus according to claim 1,
wherein the second communicating portion and the third communicating portion are configured to transmit and receive the data by wireless communication,
wherein the communication apparatus further comprises a disconnecting section configured to disconnect a connection of a communication between the communication apparatus and the data processing apparatus via the third communicating portion after the data receiving section has received the data, and
wherein the connection control section is configured to start to establish the communication between the at least one sub-communication apparatus and the external communication apparatus via the first communicating portion and the second communicating portion after the disconnecting section has disconnected the connection between the communication apparatus and the data processing apparatus.

7. A communication system comprising a data processing apparatus, a communication apparatus and at least one sub-communication apparatus, the communication apparatus comprising:
a first communicating portion configured to allow a communication apparatus to communicate with an external communication apparatus via a telephone line;
a second communicating portion configured to allow the communication apparatus to communicate with at least one sub-communication apparatus;
a third communicating portion configured to allow the communication apparatus to communicate with a data processing apparatus which is configured to process data;
a data receiving section configured to receive the data transmitted from the data processing apparatus via the third communicating portion;
a notifying section configured to transmit a notification to the at least one sub-communication apparatus via the second communicating portion in response to receipt of the data transmitted from the data processing apparatus;
a transmitting request receiving section configured to receive a transmitting request from the at least one sub-communication apparatus to which the notification had been transmitted;
a connection control section configured to establish a communication between the communication apparatus the external communication apparatus in response to a connecting command transmitted from the at least one sub-communication apparatus;
a transmitting section configured to transmit the data received by the data receiving section to the external communication apparatus in response to receipt of the transmitting request from the at least one sub-communication apparatus to which the notification had been transmitted;
a first receiving section configured to receive an identification number from the data processing apparatus via the third communicating portion, the identification number being for identifying the external communication apparatus to which the data is to be transmitted;
a dialing-number obtaining section configured to obtain a dialing number transmitted from the at least one sub-communication apparatus, wherein a dialed-external communication apparatus is the external communication apparatus with which the at least one sub-communication apparatus is under communication via the telephone line; and
a first judging section configured to judge whether the dialing number obtained by the dialing-number obtaining section and the identification number received by the first receiving section coincide with each other or not,
wherein the notifying section is configured to transmit the notification, to the at least one sub-communication apparatus, of the identification number received by the first receiving section,
wherein the transmitting section is configured to transmit the data received by the data receiving section to the external communication apparatus as the dialed-external communication apparatus when the first judging section has judged that the dialing number and the identification number coincide with each other, and
wherein each of the at least one sub-communication apparatus comprises:
a display portion configured to display thereon an identification number transmitted from the notifying section; and
a call commanding section configured to transmit a connecting command to the communication apparatus via the second communicating portion, when a selection of the identification number displayed on the display portion is received,
wherein the connection control section is configured to establish the communication between the communication apparatus and the external communication apparatus identified by the selected identification number.

8. The communication system according to claim 7, wherein, when the at least one sub-communication apparatus is a plurality of sub-communication apparatuses, the second communicating portion is configured to communicate with each of the plurality of sub-communication apparatuses,
wherein the communication apparatus further comprises a sub-communication-apparatus-information receiving section configured to receive a sub-communication-apparatus information from the data processing apparatus, the sub-communication-apparatus information being for identifying each of the plurality of sub-communication apparatuses, and
wherein the notifying section is configured to notify only at least one of the plurality of sub-communication apparatuses which is identified by the sub-communication-apparatus information.

9. The communication system according to claim 8, wherein the communication apparatus further comprises:
a storage section configured to store the data received by the data receiving section from the data processing apparatus such that the received data is associated with the identification number received by the first receiving section, wherein the storage section is configured to store the sub-communication-apparatus information received by the sub-communication-apparatus-information receiving section such that the sub-communication-apparatus information is associated with the identification number; and
an extracting section configured to extract, on condition that the sub-communication-apparatus-information receiving section receives the sub-communication-apparatus information from the data processing apparatus, the identification number which is stored in the storage section and which has been associated with the received the sub-communication-apparatus information, and
wherein the notifying section is configured to transmit the notification to the at least one of the plurality of sub-communication apparatuses which is identified by the sub-communication-apparatus information received by the sub-communication-apparatus-information receiving section, the notification comprising the identification number extracted by the extracting section.

10. The communication system according to claim 9, wherein the communication apparatus further comprises:
a second judging section configured to judge whether the identification number coinciding with the dialing number obtained by the dialing-number obtaining section is stored in the storage section or not; and
a data presence-or-absence notifying section configured to transmit the notification to the at least one of the plurality of sub-communication apparatuses which is identified by the sub-communication-apparatus information received by the sub-communication-apparatus-information receiving section, the notification comprising a result of the judgment of the second judging section.

11. The communication system according to claim 7, wherein the connection control selection is configured to establish the communication between the communication apparatus and the external communication apparatus identified by the received identification number, on condition that the first receiving section receives the identification number.

12. The communication system according to claim 7, wherein the second communicating portion and the third communicating portion are configured to transmit and receive the data by wireless communication,
wherein the communication apparatus further comprises a disconnecting section configured to disconnect a connection of a communication between the communication apparatus and the data processing apparatus via the third communicating portion after the data receiving section has received the data, and
wherein the connection control section is configured to start to establish the communication between the at least one sub-communication apparatus and the external communication apparatus via the first communicating portion and the second communicating portion after the disconnecting section has disconnected the connection between the communication apparatus and the data processing apparatus.

* * * * *